(12) United States Patent
Strope et al.

(10) Patent No.: US 11,373,086 B2
(45) Date of Patent: Jun. 28, 2022

(54) COOPERATIVELY TRAINING AND/OR USING SEPARATE INPUT AND RESPONSE NEURAL NETWORK MODELS FOR DETERMINING RESPONSE(S) FOR ELECTRONIC COMMUNICATIONS

(71) Applicant: Google Inc., Mountain View, CA (US)

(72) Inventors: Brian Strope, Palo Alto, CA (US); Yun-hsuan Sung, Mountain View, CA (US); Matthew Henderson, Redwood City, CA (US); Rami Al-Rfou', Mountain View, CA (US); Raymond Kurzweil, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 1102 days.

(21) Appl. No.: 15/476,292

(22) Filed: Mar. 31, 2017

(65) Prior Publication Data

US 2018/0240014 A1 Aug. 23, 2018

Related U.S. Application Data

(60) Provisional application No. 62/460,558, filed on Feb. 17, 2017.

(51) Int. Cl.
*G06N 3/04* (2006.01)
*H04L 51/02* (2022.01)
(Continued)

(52) U.S. Cl.
CPC ......... *G06N 3/0454* (2013.01); *G06N 3/084* (2013.01); *H04L 51/02* (2013.01); *H04L 51/046* (2013.01)

(58) Field of Classification Search
CPC ...... G06N 3/0454; G06N 3/084; H04L 51/02; H04L 51/046
See application file for complete search history.

(56) References Cited

U.S. PATENT DOCUMENTS 6,490,573 B1 12/2002 Njemanze
8,131,786 B1 * 3/2012 Bengio .................. G06K 9/66
707/748

(Continued)

FOREIGN PATENT DOCUMENTS

CN 106407311 2/2017

OTHER PUBLICATIONS

Abhay Prakash, Emulating Human Conversations using Convolutional Neural Network-based IR, 2016 (Year: 2016).*

(Continued)

*Primary Examiner* — Omar F Fernandez Rivas
*Assistant Examiner* — Tri T Nguyen
(74) *Attorney, Agent, or Firm* — Middleton Reutlinger

(57) ABSTRACT

Systems, methods, and computer readable media related to determining one or more responses to provide that are responsive to an electronic communication that is generated through interaction with a client computing device. For example, determining one or more responses to provide for presentation to a user as suggestions for inclusion in a reply to an electronic communication sent to the user. Some implementations are related to training and/or using separate input and response neural network models for determining responses for electronic communications. The input neural network model and the response neural network model can be separate, but trained and/or used cooperatively.

18 Claims, 8 Drawing Sheets

(51) Int. Cl.
G06N 3/08 (2006.01)
H04L 51/046 (2022.01)

(56) References Cited

U.S. PATENT DOCUMENTS

| | | | | |
|---|---|---|---|---|
| 9,715,496 | B1* | 7/2017 | Sapoznik | G10L 15/26 |
| 2004/0078190 | A1 | 4/2004 | Fass et al. | |
| 2011/0264640 | A1 | 10/2011 | Fontoura et al. | |
| 2013/0073632 | A1 | 3/2013 | Fedorov et al. | |
| 2013/0111348 | A1* | 5/2013 | Gruber | G06F 40/40 |
| | | | | 715/727 |
| 2014/0122388 | A1 | 5/2014 | Bai et al. | |
| 2014/0214960 | A1* | 7/2014 | Allen | G06Q 10/10 |
| | | | | 709/204 |
| 2015/0161172 | A1 | 6/2015 | Bengio et al. | |
| 2015/0169991 | A1* | 6/2015 | Zhang | G06K 9/6218 |
| | | | | 382/182 |
| 2018/0166077 | A1* | 6/2018 | Yamaguchi | G10L 15/22 |
| 2018/0174020 | A1* | 6/2018 | Wu | G06N 3/08 |

OTHER PUBLICATIONS

Rami Al-Rfou, Conversational Contextual Cues: The Case of Personalization and History for Response Ranking, 2016 (Year: 2016).*
Ji he, Deep Reinforcement Learning with a Natural Language Action Space, 2016 (Year: 2016).*
Yan et al., Learning to Respond with Deep Neural Networks for Retrieval-Based Human-Computer Conversation System, Jul. 2016, 10 pages (Year: 2016).*
International Search Report and Written Opinion of PCT Ser. No. PCT/US2018/018397; 16 pages May 2, 2018.
Das, et al.; Together We Stand: Siamese Networks for Similar Question Retrieval; Proceedings of the 54th Annual Meeting of the Association for Computational Linguistics (vol. 1: long papers), 12 pages. Aug. 12, 2016.
Grbovic et al.; "Context- and Content-aware Embeddings for Query Rewriting in Sponsored Search," Proceedings of the 38th International ACM SIGIR Conference on Research and Development in Information Retrieval; 10 pages. Jan. 2, 2015.
Neculoiu et al; "Learning Text Similarity with Siamese Recurrent Networks," Proceedings of the 1st Workshop on Representation Learning for NLP; 10 pages. Aug. 11, 2016.
Gordo et al; "Deep Image Retrieval: Learning Global Representations for Image Search," ECCV 2016 Conference; [Lecture Notes in Computer Science]; Springer International Publishing, 17 pages. Sep. 17, 2016.
Prakash et al., "Emulating Human Conversations Using Convolutional Neural Network-based IR", ARXIV. Org, Cornell University Library, Ithaca, NY, 6 pages. Jun. 22, 2016.
Kang et al., "A Short Texts Matching Method Using Shallow Features and Deep Features", Communications in Computer and Information Science, Springer, DE, ISSN: 1865-0929, vol. 496, 10 pages. Jan. 1, 2014.
He et al., "Deep Reinforcement Learning with an Action Space Defined by Natural Language", ICLR 2016 workshop, 18 pages, retrieved from the internet: URL:https://openreview.net/pdf?id=WL9AjgWvPf5zMX2Kfoj5. Feb. 14, 2016.
European Patent Office; International Preliminary Report on Patentability of Ser. No. PCT/US2018/018397; 25 pages; dated May 29, 2019.
European Patent Office; Written Opinion of the International Preliminary Examining Authority of PCT Ser. No. PCT/US2018/018397; 12 pages; dated Jan. 23, 2019.
Abadi, et al.; Tensorflow: A system for Large-scale Machine Learning; In USENIX Symposium on Operating Systems Design and Implementation (OSDI), 20 Pages; dated 2016.
Al-Rfou, et al.; Conversational Contextual Cues: The Case of Personalization and History for Response Ranking; 10 Pages; US; dated Jun. 1, 2016.
Auvolat, et al.; Clustering is Efficient for Approximate Maximum Inner Product Search; 10 Pages; dated Nov. 30, 2015.
Gray, R. M.; Vector Quantization; pp. 205-231; dated 1984.
Guo, R.; et al; Quantization Based Fast Inner Product Search; In International Conference on Artificial Intelligence and Statistics; pp. 482-490; dated 2016.
He, H. et al.; Multi-perspective Sentence Similarity Modeling with Convolutional Neural Networks; Empirical Methods on Natural Language Processing; pp. 1576-1586; dated Sep. 2015.
Henderson, M. et al.; Word-Based Dialog State Tracking with Recurrent Neural Networks; Department of Engineering and University of Cambridge; pp. 292-299; UK; dated Jun. 2014.
Hochreiter, S.; Long Short-term Memory; Neural Computation; 46 Pages; dated Nov. 1997.
Huang et al. Learning Deep Structured Semantic Models for Web Search Using Clickthrough Data, 8 Pages; dated 2013.
Jegou, H. et al. Product Quantization for Nearest Neighbor Search. Pattern Analysis and Machine Intelligence, 33(1), 15 pages; dated 2011.
Kannan, A. et al.; Smart Reply: Automated Response Suggestion for Email. In Conference on Knowledge Discovery and Data Mining (KDD). ACM; dated 2016.
Kurzweil, R.; How to Create a Mind: The Secret of Human Thought Revealed. Penguin Books, New York, US; dated 2013.
Le, Q. V. et al. Distributed Representations of Sentences and Documents. In International Conference on Machine Learning (ICML); dated 2014.
Mesnil, G. et al.; Using Recurrent Neural Networks for Slot Filling in Spoken Language Understanding; 14 Pages; dated 2015.
Mikolov, T. et al.; Efficient Estimation of Word Representations in Vector Space, pp. 1-12; dated 2013.
Norouzi, M. et al.; Cartesian K-means. In Conference on Computer Vision and Pattern Recognition; pp. 3017-3024, CA; dated 2013.
Pennington, J. et al. Glove: Global Vectors for Word Representation. In Empirical Methods on Natural Language Processing; pp. 1532-1543; US; dated 2014.
Price, P. J.; Evaluation of Spoken Language Systems: The ATIS Domain. In Workshop on Speech and Natural Language. Association for Computational Linguistics; pp. 91-95; dated 1990.
Serban, I. V et al.; Building End-To-End Dialogue Systems Using Generative Hierarchical Neural Network Models. In Conference on Artificial Intelligence, pp. 3776-3783; CA; dated 2016.
Shazeer, N. et al.; Swivel: Improving Embeddings by Noticing What's Missing; 9 pages; US; dated Feb. 6, 2016.
Shen, F.et al.; Learning Binary Codes for Maximum Inner Product Search. In International Conference on Computer Vision; pp. 4148-4156; dated 2015.
Shrivastava, A. et al.; LSH (ALSH) for Sublinear Time Maximum Inner Product Search (MIPS). In Advances in neural information processing systems (NIPS); pp. 1-9; US; dated 2014.
Sutskever, I. et al.; Sequence to Sequence Learning with Neural Networks. In Advances in neural information processing systems (NIPS); pp. 1-9; dated 2014.
O. Vinyals, et al. Grammar as a Foreign Language. In Advances in Neural Information Processing Systems (NIPS); 8 pages; dated Jul. 22, 2015.
Vinyals, O. et al. A Neural Conversational Model. In International Conference on Machine Learning (ICML); pp. 1-9; dated 2015.
Wen, T.H., et al. A Network-Based End-To-End Trainable Task-Oriented Dialogue System; 12 pages; UK; dated Apr. 24, 2016.
Williams, J. D. et al. End-to-end LSTM-based Dialog Control Optimized With Supervised and Reinforcement Learning; 10 pages; US; dated Jun. 3, 2016.
Wu, Y. et al. Google's Neural Machine Translation System: Bridging the Gap between Human and Machine Translation; pp. 1-23; dated Oct. 8, 2016.
Yao, K. et al. Recurrent Neural Networks for Language Understanding; In Interspeech; pp. 2524-2528; dated 2013.
Yin, W. et al. ABCNN: Attention-based Convolutional Neural Network for Modeling Sentence Pairs; Transactions of the Association for Computational Linguistics; 15 pages; dated Apr. 9, 2016.
Young, S.; Talking to Machines (statistically speaking); In Interspeech 8 pages; GB; dated 2002.

(56) References Cited

OTHER PUBLICATIONS

European Patent Office; Communication Pursuant to Article 94(3) EPC issue in Application No. EP18707834.0; 11 pages; dated Nov. 25, 2020.
Jaech et al.; Match-Tensor: a Deep Relevance Model for Search; 10 pages; dated Jan. 2017.
European Patent Office; Communication Pursuant to Article 94(3) EPC issue in Application No. EP18707834.0; 11 pages; dated Jan. 17, 2022.

* cited by examiner

COOPERATIVELY TRAINING AND/OR USING SEPARATE INPUT AND RESPONSE NEURAL NETWORK MODELS FOR DETERMINING RESPONSE(S) FOR ELECTRONIC COMMUNICATIONS

BACKGROUND

Users are often inundated with electronic communications such as emails, SMS (short message service) communications, chat communications, social networking communications, etc. Many electronic communications that are sent to a user explicitly solicit a reply or otherwise contain information to which the user may wish to reply. For example, an email that contains "Are you interested in grabbing lunch?" may explicitly solicit a reply. An email that contains "I just got engaged!" may not explicitly solicit a reply, but a user that receives the email may still wish to send a congratulatory reply to the email. Users formulate replies to the electronic communications and input the formulated replies at client devices utilizing a keyboard (e.g., a virtual keyboard of a smartphone or tablet), a microphone, and/or other user interface input device(s) of the client device.

SUMMARY

Implementations of this specification are directed to systems, methods, and computer readable media related to determining one or more responses to provide that are responsive to an electronic communication that is generated by a user through interaction with a client computing device.

Some implementations are related to determining one or more responses to provide for presentation to a user as suggestions for inclusion in a reply to an electronic communication sent to the user. For example, in some situations it may be desirable to suggest one or more responses to a user for inclusion in a reply electronic communication that is a reply to an electronic communication transmitted to the user. For instance, if a chat message of "Are you interested in grabbing lunch?" is transmitted to a client device of a user, it may be desirable to provide the user with responses that can be selected by the user, via the client device, (e.g., with a single-tap or other single-selection input) for inclusion in a reply chat message that is responsive to the received chat message. For instance, responses such as "Sure, what time?", "Thanks, but I'm busy", and "I'll get back to you" may be provided as suggestions based on their contextual relevance to the received chat message of "Are you interested in grabbing lunch?". Selection of one of the provided responses by the user will reduce the number of user inputs that a user must make to formulate the reply, which may reduce the usage of various client device computational resources and/or be of particular benefit to users that have low dexterity (or who otherwise have difficulties making user inputs to a client device).

However, some techniques for determining suggested responses for an electronic communication may have one or more drawbacks. For example, some techniques may have an undesirable amount of latency in determining suggested responses for an electronic communication and/or may consume an undesirable amount of computational resources in determining the suggested responses. For instance, in determining suggested responses for an electronic communication, some techniques may, for each candidate response, apply features of the candidate response and apply features of the electronic communication to a neural network model that is trained to predict the likelihood of the candidate response in view of both features of the electronic communication and features of the candidate response. In other words, for each candidate response, both the features of the candidate response and the features of the electronic communication are jointly applied as input to the model and both sets of features are jointly considered in combination in determining the likelihood over the model. This can cause undesirable latency and/or computational resource consumption.

In view of these and/or other considerations, some implementations of this specification are directed to various techniques related to training and/or using separate input and response neural network models for determining responses for electronic communications. The input neural network model and the response neural network model can be separate. Although separate, as described herein they are trained and used cooperatively. The input neural network model and the response neural network model can be "separate" in that separate inputs are applied to the neural network models, and each of the neural network models is used to generate its own feature vector based on its applied input. In particular, input features of an electronic communication can be applied to the input neural network model to generate an input vector over that model (without usage of any of the response features applied to the response neural network model), and response features of a response can be applied to the response neural network model to generate a response vector over that model (without usage of any of the input features applied of any of the input features applied to the input neural network model). A comparison of the input vector and the response vector can then be performed, where the comparison indicates a likelihood that the response is an appropriate response to the electronic communication. In some implementations, the comparison of the input vector and the response vector is a dot product of the feature vectors, which results in a scalar value that indicates a likelihood that the response is an appropriate response to the electronic communication. For instance, the dot product can result in a scalar value from 0 to 1, where the magnitude of the scalar value indicates the likelihood.

During training of the input neural network model and the response neural network model, training instances are utilized that each include input features of an input electronic communication, and response features of a response. For positive training instances, the response is utilized based on it being indicated as actually being a "response" to the input electronic communication. For example, the input electronic communication may be an earlier in time email, text message, chat message, etc. of a first user to one or more additional users—and the response may be all or portions of a responsive email, text message, chat message, etc. of one of the additional users.

During training, the input features of a training instance are applied as input to the input neural network model and an input vector generated over the input neural network model based on that input. Further, the response features of a training instance are applied as input to the response neural network model and a response vector generated over the response neural network model based on that input. A response score can then be determined based on comparison of the input vector and the response vector. For example, the response score can be based on the dot product of the input vector and the response vector. For instance, the dot product can result in a value from 0 to 1, with "1" indicating the highest likelihood a corresponding response is an appropriate response to a corresponding electronic communication and "0" indicating the lowest likelihood. Both the input neural network model and the response neural network model can then be updated based on comparison of: the response score (and optionally additional response scores in batch techniques described herein); and a response score indicated by the training instance (e.g., a "1" or other "positive" response score for a positive training instance, a "0" or other "negative" response score for a negative training instance). For example, an error can be determined based on a difference between the response score and the indicated response score, and the error backpropagated through both neural networks of the model.

Through such training, each of the two separate neural network models is trained to be utilized independently to derive a corresponding feature vector that provides an implicit semantic representation of a corresponding input. Further, through training on positive instances each based on electronic communications and actual responses, and negative instances each based on electronic communications and responses that are not actual responses, the implicit semantic representation of the corresponding input is grounded in learned differences between: electronic communications and actual responses; and electronic communications and responses that are not actual responses.

After training, input features of a new electronic communication can be applied as input to the input neural network model, and an input vector generated over the input neural network model based on that input. Further, after training, response features of a response can be applied as input to the response neural network model, and a response vector generated over the response neural network model based on that input. The input vector can be compared to the response vector to determine a response score that indicates a likelihood that the response is an appropriate response for the electronic communication. For example, the response score can be based on the dot product of the input vector and the response vector. For instance, the dot product can result in a value from 0 to 1, with "1" indicating the highest likelihood a corresponding response is an appropriate response to a corresponding electronic communication and "0" indicating the lowest likelihood.

Such a response score can be used in determining whether to provide the response in response to the electronic communication. For example, where the electronic communication is directed to a user, the response score can be utilized in determining whether to provide the response for presentation to a user as a suggestion for inclusion in a reply to the electronic communication.

Since the trained response neural network model can be utilized independently, in some implementations the trained response neural network model can be used to pre-determine response vectors for a plurality of responses (e.g., for all responses of a "whitelist" of responses), and those response vectors indexed or otherwise stored in association with their corresponding responses. The relevance of a given response to an electronic communication can thus be determined through comparison of an input vector for the electronic communication (determined based on the also independently utilizable input neural network model) to the pre-stored response vector of the response. This obviates the need for a run-time determination of the pre-stored response vector, conserving various computational resources at run-time. Further, since at run-time the input vector is determined based on applied input features of the electronic communication (and independent of application of any response features), the same input vector can be compared to the response vectors of additional responses. This enables determination of an input vector through a single call of an input neural network model at run-time, and usage of that input vector in determining responses for an electronic communication. In some implementations, input vectors for some electronic communications (e.g., frequent communications) may additionally or alternatively be pre-determined and stored in association with their corresponding electronic communications to further increase efficiency at run-time. Additional description of the training and usage of the input neural network model and the response neural network model are provided herein.

In some implementations, a method is provided that includes identifying a plurality of positive training instances that each include input features and reply features. For each of the positive training instances: the input features are based on content of an electronic communication, and the reply features are based on a reply electronic communication that is a reply to the electronic communication. The method further includes training a scoring model based on the positive training instances. Training the scoring model based on a given instance of the positive training instances includes: generating an input vector based on applying the input features to an input neural network model of the scoring model; generating a response vector based on applying the response features to a response neural network model of the scoring model; determining a response score based on comparison of the input vector and the response vector; and updating both the input neural network model and the response neural network model based on comparison of the response score to a given response score indicated by the given instance.

In some implementations, a method is provided that includes: identifying input features of a transmitted electronic communication directed to a user; applying the input features to a trained input neural network model; generating an input vector over the trained input neural network model based on applying the input features to the trained input neural network model; and determining a response to provide for inclusion in a reply electronic communication that is a reply by the user to the electronic communication, wherein determining the response is based on comparison of the input vector to a pre-stored value stored in association with the response prior to transmission of the electronic communication. In some of those implementations, the pre-stored value is generated based on applying response features of the response to a separate response neural network model. In some versions of those implementations, the trained input neural network model is trained based on backpropagation that is based on errors during training, where each of the errors is determined during the training as a function of: a corresponding training input vector generated over the trained input neural network model based on a corresponding training instance, and a corresponding training response vector generated over the separate response neural network model based on the corresponding training instance.

In some implementations, a method is provided that includes: identifying input features of a transmitted electronic communication directed to a user; applying the input features to a trained input neural network model; generating an input vector over the trained input neural network model based on applying the input features to the trained input neural network model; and determining a response score for a candidate response to the transmitted electronic communication. Determining the response score is based on a dot product of the input vector and a response vector stored in association with the candidate response, where the response vector is stored in association with the candidate response prior to transmission of the electronic communication. The method further includes determining, based on the response score, to provide the candidate response for inclusion in a reply electronic communication that is a reply by the user to the electronic communication.

In some implementations, a method is provided that includes: identifying input features of a transmitted electronic communication directed to a user; applying the input features to a trained input neural network model; generating an input vector over the trained input neural network model based on applying the input features to the trained input neural network model; and determining a response score for a candidate response to the transmitted electronic communication. Determining the is based on comparison of the input vector to a response vector stored in association with the candidate response. The response vector stored in association with the candidate response is generated based on an additional trained neural network model that is separate from the trained input neural network model, but that was trained cooperatively with the trained neural network model based on errors that were a function of both models. The method further includes determining, based on the response score, to provide the candidate response for inclusion in a reply electronic communication that is a reply by the user to the electronic communication.

In some implementations, a method is provided that includes: receiving an electronic communication generated based on user interface input provided at a client device; applying input features of the electronic communication to a trained input neural network model; generating an input vector over the trained input neural network model based on applying the input features to the trained input neural network model; determining a response score for a candidate response to the electronic communication based on comparison of the input vector to a response vector stored in association with the candidate response, where the response vector stored in association with the candidate response is generated based on an additional trained neural network model that is separate from the trained input neural network model, but that was trained cooperatively with the trained neural network model based on errors that were a function of both models; and providing, based on the response score, the candidate response to the client device as an automated reply.

Various implementations disclosed herein may include one or more non-transitory computer readable storage media storing instructions executable by a processor (e.g., a central processing unit (CPU), graphics processing unit (GPU), and/or Tensor Processing Unit (TPU)) to perform a method such as one or more of the methods described herein. Yet other various implementations may include a system of one or more computers that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION OF THE DRAWINGS

Figure 1:
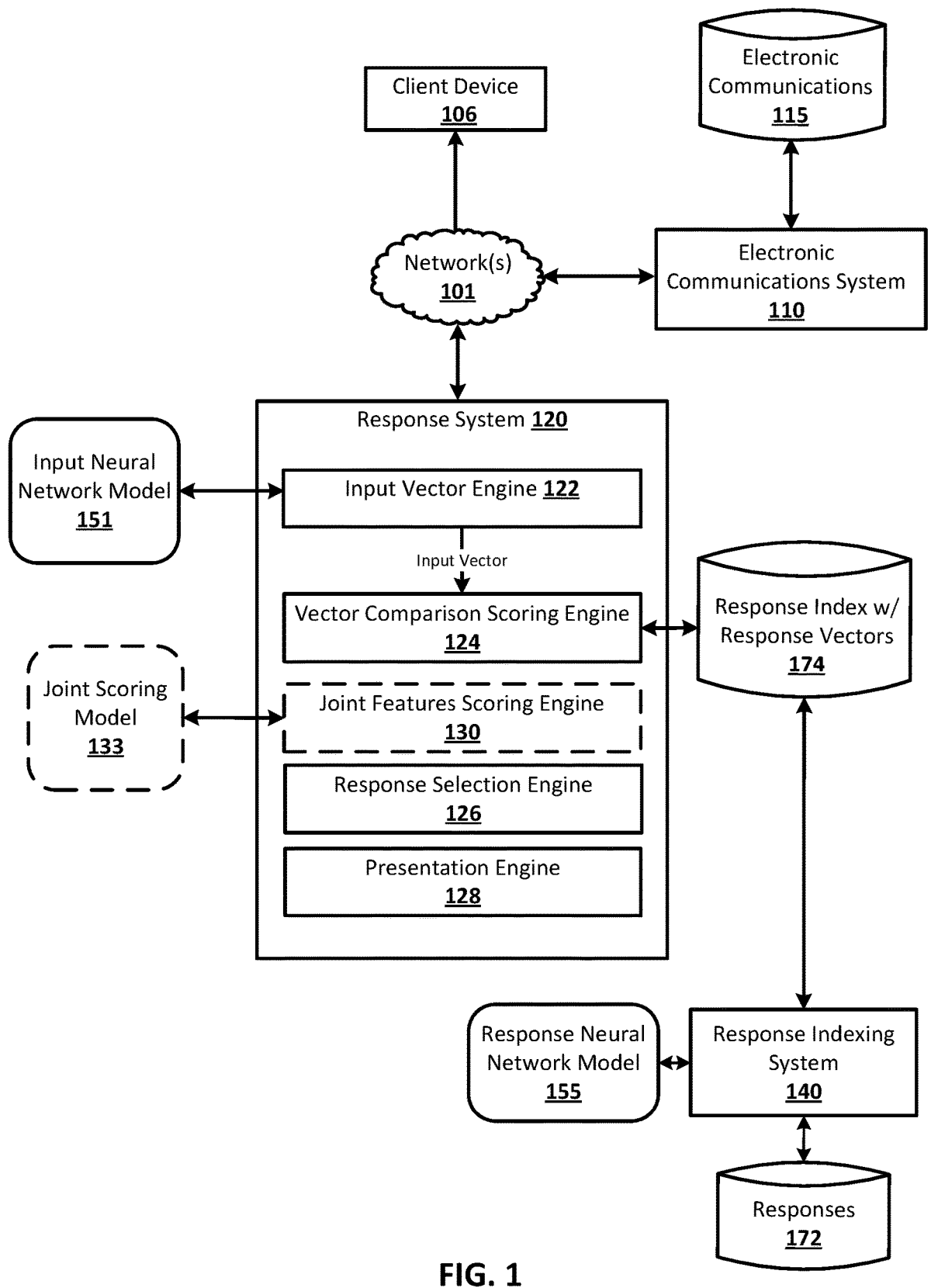
FIG. 1 is a block diagram of an example environment in which implementations disclosed herein may be implemented.

FIG. 1 illustrates a block diagram of an example environment in which implementations disclosed herein may be implemented. The example environment includes a communication network 101 that facilitates communication between the various components in the environment. In some implementations, the communication network 101 may include a wide area network (WAN) such as the Internet, one or more intranets, and/or one or more bus subsystems. The communication network 101 may optionally utilize one or more standard communications technologies, protocols, and/or inter-process communication techniques.

The example environment of FIG. 1 also includes a client device 106, an electronic communications system 110, a response system 120, and a response indexing system 140.

Electronic communications system 110, response system 120, and response indexing system 140 may each be implemented in one or more computing devices that communicate, for example, through a network (e.g., network 101 and/or other network). Electronic communications system 110, response system 120, and response indexing system 140 are example systems in which the systems, components, and techniques described herein may be implemented and/or with which systems, components, and techniques described herein may interface. They may each include one or more memories for storage of data and software applications, one or more processors for accessing data and executing applications, and other components that facilitate communication over a network. The operations performed by one or more of the systems 110, 120, and 140 may each be distributed across multiple computer systems. In some implementations, one or more aspects of the system 110, system 120, and/or system 140 may be combined in a single system and/or one or more aspects may be implemented on the client device 106.

FIG. 1 also includes an electronic communications database 115 that includes one or more storage mediums that include all, or portions of, electronic communications of a plurality of users. In some implementations, the electronic communications database 115 is maintained by the electronic communications system 110. For example, the electronic communications system 110 may include one or more email systems and the electronic communications database 115 may include a plurality of emails that are sent and/or received via the email systems. As another example, the electronic communications system 110 may include one or more social networking systems and the electronic communications database 115 may include a plurality of messages, posts, or other communications that are sent and/or received via the social networking systems.

As used herein, an "electronic communication" or "communication" may refer to an email, a text message (e.g., SMS, MMS), an instant message, a transcribed voicemail, or any other electronic communication that is sent from a first user to a restricted group of one or more additional users. In various implementations, an electronic communication may include various metadata and the metadata may optionally be utilized in one or more techniques described herein (e.g., used as input features). For example, an electronic communication such as an email may include an electronic communication address such as one or more sender identifiers (e.g., sender email addresses), one or more recipient identifiers (e.g., recipient email addresses, including cc'd and bcc'd recipients), a date sent, one or more attachments, a subject, a type of device that sent and/or received the electronic communication, and so forth.

As used herein, "electronic communication" and "communication" will be utilized, depending on the context, to refer to both an electronic communication that includes only a single "initial" message and an electronic communication that includes an initial message and one or more additional messages that are subsequent to the initial message. For example, an electronic communication may include an "initial" message from a first user and an additional message that is a reply message from a second user. Also, for example, an electronic communication may include an "initial" message from a first user and an additional message that is also from the first user. Accordingly, candidate responses described herein may be generated based on a received communication that includes just a single initial message, or a received communication that includes the initial message and one or more additional messages. An electronic communication may be a single document such as an email that includes both an initial message and one or more additional messages, and that can optionally be processed to distinguish the original message and the additional message(s).

Processing an electronic communication to distinguish an initial message and an additional message may include "splitting" the message based on presence of metadata, message breaks, header information included in the message, quotes provided around the initial message, etc. An electronic communication may also be multiple documents that are mapped to one another based on at least one of the multiple documents being responsive to another of the multiple documents. For example, an electronic communication may include a first email that is an original message received by a user and a second email sent by the user as a reply to that original message, or original and reply SMS messages. The mapping of multiple documents to one another may be performed, for example, by the electronic communications system 110. For example, the electronic communications system 110 may map a first email to a second email based on a user selecting a "reply" user interface element when viewing the first email and then drafting the second email responsive to selecting the reply user interface element.

Generally, response system 120 determines and provides suggested responses to include in a reply to an electronic communication, such as an electronic communication provided by client device 106 and/or an electronic communication of electronic communications database 115 to which a user has yet to reply. As described herein, the response system 120 may utilize various techniques in determining which responses should be provided as suggestions to include in a reply to a given communication. In some implementations, the response system 120 may provide the determined responses as suggestions independent of any textual input provided by the user in generating the reply to the communication and/or independent any other content (e.g., voice input, graphical elements) provided by the user in generating the reply to the communication.

In various implementations, response system 120 may include an input vector engine 122, a vector comparison scoring engine 124, a response selection engine 126, a presentation engine 128, and optionally a joint features scoring engine 130. In some implementations, aspects of one or more of engines 122, 124, 128, and/or 130 may be omitted, combined, and/or implemented in a component that is separate from response system 120, such as client device 106 and/or electronic communications system 110.

Description of the components of response system 120 is provided below with reference to an electronic communication of a user, such as an electronic communication provided by client device 106 and/or an electronic communication of electronic communications database 115 to which the user has yet to reply. Although a single electronic communication is referenced in the examples for clarity, it is understood that the response system 120 may determine suggested responses for additional electronic communications of the user and/or of additional users. For example, the response system 120 may manage determination of suggested responses for each of multiple client devices via different sessions and may manage multiple sessions in parallel. For instance, the response system 120 may be implemented as a cloud-based service employing a cloud infrastructure, e.g., using a server farm or cluster of high performance computers running software suitable for handling high volumes of requests from multiple users. However, for the sake of simplicity, many examples herein are described with respect to a single client device 106 and a single electronic communication.

The input vector engine 122 determines input features of a received electronic communication, and applies those input features to input neural network model 151. The input neural network model 151 is a deep neural network model that can be stored in one or more computer readable media accessible to the input vector engine 122. As described herein, the input vector engine 122 operates over the input neural network model 151 by applying inputs to the model and generating outputs over the model based on learned parameters of the model.

The input features that are determined and applied to the input neural network model 151 can take various forms, and will be dependent on the representations used to train the input neural network model 151. As some non-limiting limiting examples, the input features may include: communication body features (e.g., based on text and/or other content of the body of the communication, optionally excluding boilerplate sentences); first sentence features (e.g., based on the first sentence of the body); last sentence features (e.g., based on the last sentence of the body); subject features (e.g., based on the subject line of the communication); author features (based on an author of the communication); and/or temporal features (e.g., based on the date, time, day of the week the communication was sent); etc. Where input features are based on text of the communication, the features may be a representation of the text such as a bag of words embedding of various n-grams (e.g., unigrams, bigrams, trigrams, and/or other n-grams) of the text. For example, the communication body feature may be a bag of words embedding of the terms of the body of the communication. As another example where features are based on text, all or parts of the text may be applied on a token by token basis to a long short-term memory (LSTM) neural network model, and a hidden state of the LSTM model after the application may be used as the features of the text. As yet another example, the representation of the text may be based on an embedding of all or parts of the text based on another model, such as a GloVE embedding model and/or a Word2Vec embedding model. Additional and/or alternative features may be utilized.

Regardless of the form of the input features of the communication, the input vector engine 122 generates an input vector based on application of the input features to the input neural network model 151. As described herein, in some implementations the input vector engine 122 determines different groups of input features (e.g., a first group of body features, a second group of subject features, etc.) and applies each of the groups as input to different groups of parallel layers of the input neural network model 151. The input vector engine 122 may generate an intermediate output based on each of the groups of parallel layers and their corresponding inputs, then provide the intermediate outputs as input to one or more downstream layers to generate the input vector.

The input vector engine 122 provides the input vector to the vector comparison scoring engine 124. The vector comparison scoring engine 124 uses the input vector to determine a subset of available responses that are likely appropriate responses for inclusion in a reply to the electronic communication. The vector comparison scoring engine 124 can compare the input vector to response vectors (and/or additional values determined based on the response vectors) of response index with response vectors 174, to determine the subset of available responses that are appropriate. As described herein, the response index with response vectors 174 can include, for each of a plurality of available responses, a pre-stored association of the available response to a corresponding response vector. The response indexing system 140 can generate the association of a response to a response vector based on application of features of the response (e.g., a response identified from responses database 172) to a response neural network model 155. Additional description is provided herein.

As one example, to determine the appropriateness of a given response for an electronic communication, the vector comparison scoring engine 124 can determine a response score for the given response based on the result of a dot product between the input vector and the response vector stored in association with the given response. For example, the response score can be the scalar result of the dot product.

In some implementations, the vector comparison scoring engine 124 may determine, for inclusion in a subset, only a threshold quantity of responses and/or only responses whose corresponding response scores satisfy a threshold. In some implementations, the vector comparison scoring engine 124 may utilize one or more techniques to obviate the need to search all of the response vectors and/or to obviate the need to determine a dot product between the input vector and each of the response vectors of response index with response vectors 174. For example, as mentioned below, response index with response vectors 174 may include multiple clusters of response vectors. In such an example, the vector comparison scoring engine 124 can compare the input vector to a vector associated with each of one or more clusters (e.g., a mean vector or other representative vector of each cluster) to identify a subset of the vectors that are most relevant to a given input vector. The vector comparison scoring engine 124 may then calculate response scores for only response vectors of the subset. It is noted that in some implementations, by comparing the input vector to response vectors associated with each of the clusters, a tree-based and/or other approach may be utilized to enable efficient identification of cluster(s) that are most relevant to the input vector, without necessitating comparison of the input vector to a response vector of each and every one of the clusters. For example, only the response vectors for a subset of the clusters may be analyzed to efficiently identify one or more potentially relevant clusters, and then optionally dot products determined only for the response vectors for those cluster(s).

The vector comparison scoring engine 124 provides an indication of the determined subset of candidate responses, and optionally corresponding determined response scores, to the response selection engine 126. The response selection engine 126 selects one or more (e.g., all) of the subset of candidate responses for inclusion in a selected set to provide to presentation engine 128 for presentation as suggested responses. Those responses selected for presentation as suggested responses are also referred to as "selected responses".

As one example, the vector comparison scoring engine 124 may provide a subset of candidate responses and scores, and the response selection engine 126 may select one or more of those based solely on the scores (e.g., only the "X" responses with the "best" scores). As another example, the vector comparison scoring engine 124 may provide a subset of candidate responses and scores, and the response selection engine 126 may select one or more of those based on the scores and based on one or more additional factors. For instance, the one or more additional factors may be diversity (e.g., to promote semantic diversity among the provided responses), response lengths of the responses (e.g., to ensure the provided responses can collectively "fit" in a corresponding user interface), etc. As another instance, the one or more additional factors may include joint feature scores determined by joint features scoring engine 130 for the responses of the subset of candidate responses.

Joint features scoring engine 130 is optional and utilizes a joint scoring model 133 to determine additional joint feature scores. The joint scoring model 133 can be a deep neural network model trained to provide, based on jointly applied features of a response and features of electronic communication as input, an output that indicates the appropriateness of the response for the communication. The joint features scoring engine 130 applies, jointly, features of a response and features of an electronic communication as input to the joint scoring model 133. The joint features scoring engine 130 generates a joint features score over the model 133 based on jointly applying the features of the response and the feature of the electronic communication. In view of the inefficiency of the techniques utilized by the joint features scoring engine 130 (relative to those utilized by the vector comparison scoring engine 124), the joint feature scoring engine 130 may optionally be utilized on only the subset of candidate responses determined by the vector comparison scoring engine 124. The inefficiency of the joint features scoring engine 130 may stem from, for example, the need to apply jointly both response features and message features to determine a joint response score for any given response.

In some implementations, the vector comparison scoring engine 124 and the response selection engine 126 may be effectively "combined". For example, the vector comparison scoring engine 124 can use its own determined scores to determine the most relevant candidate responses, and provide those responses directly to the presentation engine 128 as selected responses for presentation as suggested responses.

The presentation engine 128 provides the selected responses for inclusion in a reply electronic communication that is a reply by the user to the electronic communication. For example, the presentation engine 128 may present one or more user interface indications (e.g., graphical, audible) of the selected responses and, when a user generating the reply selects one of the indications, the corresponding response may be automatically incorporated in the reply. The reply may then be automatically sent and/or sent in response to further user interface input of the user (optionally after the user has added additional content to the reply). Such automatic incorporation of a selected response into a reply message saves the user from manually entering the selected response, and saves a number of user interaction steps and corresponding input required to establish a reply message that includes the response.

In some implementations, the presentation engine 128 provides the selected responses independent of any input and/or other content provided via a computing device of the user in generating a reply to the electronic communication. In some of those implementations, the selected responses may be determined by the response selection engine 126 before the user has even viewed or otherwise consumed the communication. For example, the response system 120 may process a communication in advance of viewing by the user, and presentation engine 128 may append or otherwise associate the selected responses with the electronic communication before it is even viewed by the user. Hence, if a user views or otherwise consumes the electronic communication, selected responses to the electronic communication can be provided promptly without delay.

In some implementations where the electronic communication is provided to the response system 120 by the client device 106, the presentation engine 128 may provide the selected responses to the client device 106 for presentation to the user as options for including in a reply. In some implementations where the electronic communication is provided to the response system 120 by the electronic communications system 110 via the electronic communications database 115, the presentation engine 128 may store an association of the selected responses with the electronic communication in the electronic communications database 115 and/or other databases. In some implementations, one or more (e.g., all) aspects of the presentation engine 128 may be implemented by the client device 106 and/or the electronic communications system 110.

The presentation engine 128 may also provide display prominence information with the selected responses that indicates the prominence (e.g., position, size, color) with which those responses should be presented. Generally, a higher score for a particular response, the greater the prominence for that particular response. As one example, the scores for responses determined by the vector comparison scoring engine 124 may be utilized.

In some implementations, the presentation engine 128 provides only the selected responses (or associated identifiers), and potentially prominence information, and the client device 106 and/or electronic communications system 110 may generate a display of the selected documents based on the provided data. In some implementations, the presentation engine 128 may additionally provide some or all of the data necessary to generate the display. In some of those implementations, any provided prominence information may be incorporated in the data that indicates how the display should be presented.

Figure 2A:
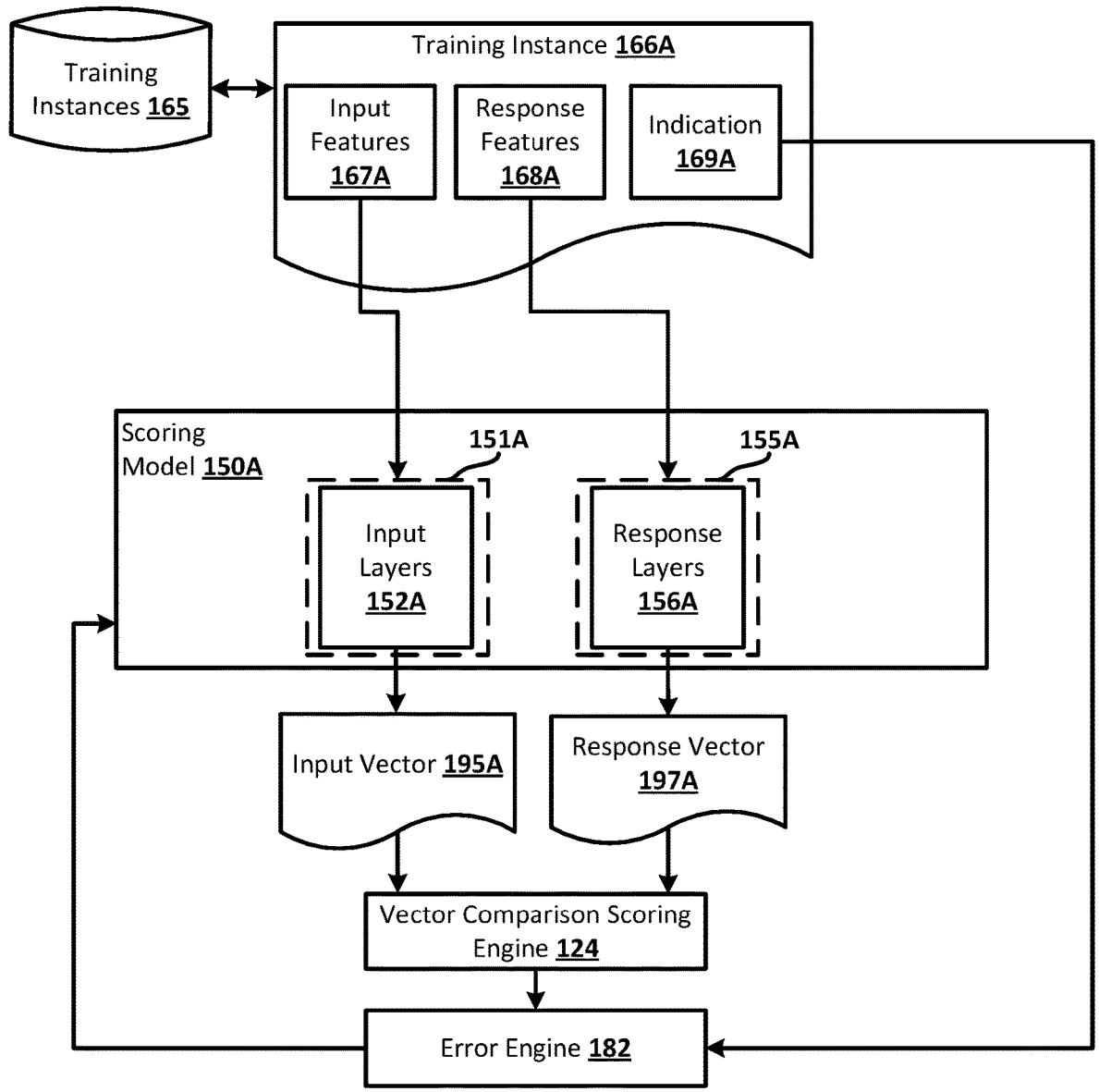
FIG. 2A illustrates an example of training an implementation of a scoring model.

FIG. 2A illustrates an example of training an implementation of a scoring model 150A. The scoring model 150A includes an implementation 151A of the input neural network model 151 of FIG. 1 and an implementation 155A of the response neural network model 155 of FIG. 1. The training of the scoring model 150A may be performed by a training engine (e.g., implemented by one or more CPUs, GPUs, and/or TPUs) and the training engine may include the error engine 182 of FIG. 2A.

In FIG. 2A, a training instance 166A is retrieved from training instances database 165. The training instance includes input features 167A, response features 168A, and an indication 169A. The input features 167A can be based on features of an electronic communication, such as those described herein (e.g., body features). The response features 168A can be based on features of a true response to the electronic communication when the training instance 166A is a positive instance, or a response that is not a true response when the training instance 166A is a negative instance. The indication 169A indicates whether the training instance 166A is a negative or positive training instance (i.e., whether the response features 168A are for a response that is a true response to a communication on which the input features 167A are based).

The input features 167A of the training instance 166A are applied as input to the input layers 152A of the input neural network model 151A of the scoring model 150A. An input vector 195A is generated over the input layers 152A based on the application of the input features 167A.

The response features 168A of the training instance 166A are applied as input to the response layers 156A of the response neural network model 155A of the scoring model 150A. An input vector 197A is generated over the response layers 156A based on the application of the response features 168A.

The vector comparison scoring engine 124 determines a response score based on comparison of the input vector 195A and the response vector 197A. For example, the vector comparison scoring engine 124 can determine a response score that is the scalar result of a dot product between the two vectors. It is noted that input vector 195A is generated based on application of the input features 167A to input layers 152A and is generated independent of the response layers 156A and the response features 168A. Likewise, the response vector 197A is generated based on application of the response features 168A and is generated independent of the input layers 152A and the input features 167A. It is only the outputs (vectors 195A and 197A) generated over the separate input neural network model 151A and response neural network model 155A that are compared during training (although such comparison is used to generate an error for backpropagation of both networks 151A and 155A as described below and elsewhere herein).

The vector comparison scoring engine 124 provides the response score to the error engine 182. The error engine 182 determines the error (if any) of the vector comparison scoring engine 124 based on comparison of the response score to the actual response score indicated by the indication 169A. For example, the indication 169A may be a "1" (or other value) if the training instance 166A is a positive training instance, and a "0" (or other value) if the training instance 166A is a negative training instance. The error engine 182 then updates both the input neural network model 151A and the response neural network model 155A based on the error (and optionally based on other error(s) determined for a batch of training instances, when batch learning is utilized and the training instance 166A of FIG. 2A is part of the batch). For example, the error engine 182 may perform, based on the error and a loss function, backpropagation over the input layers 152A and the response layers 156A.

Although FIG. 2A is illustrated with respect to a single training instance, it is understood that during training of the scoring model 150A a large quantity of training instances will be utilized in training the scoring model 150A.

Figure 2B:
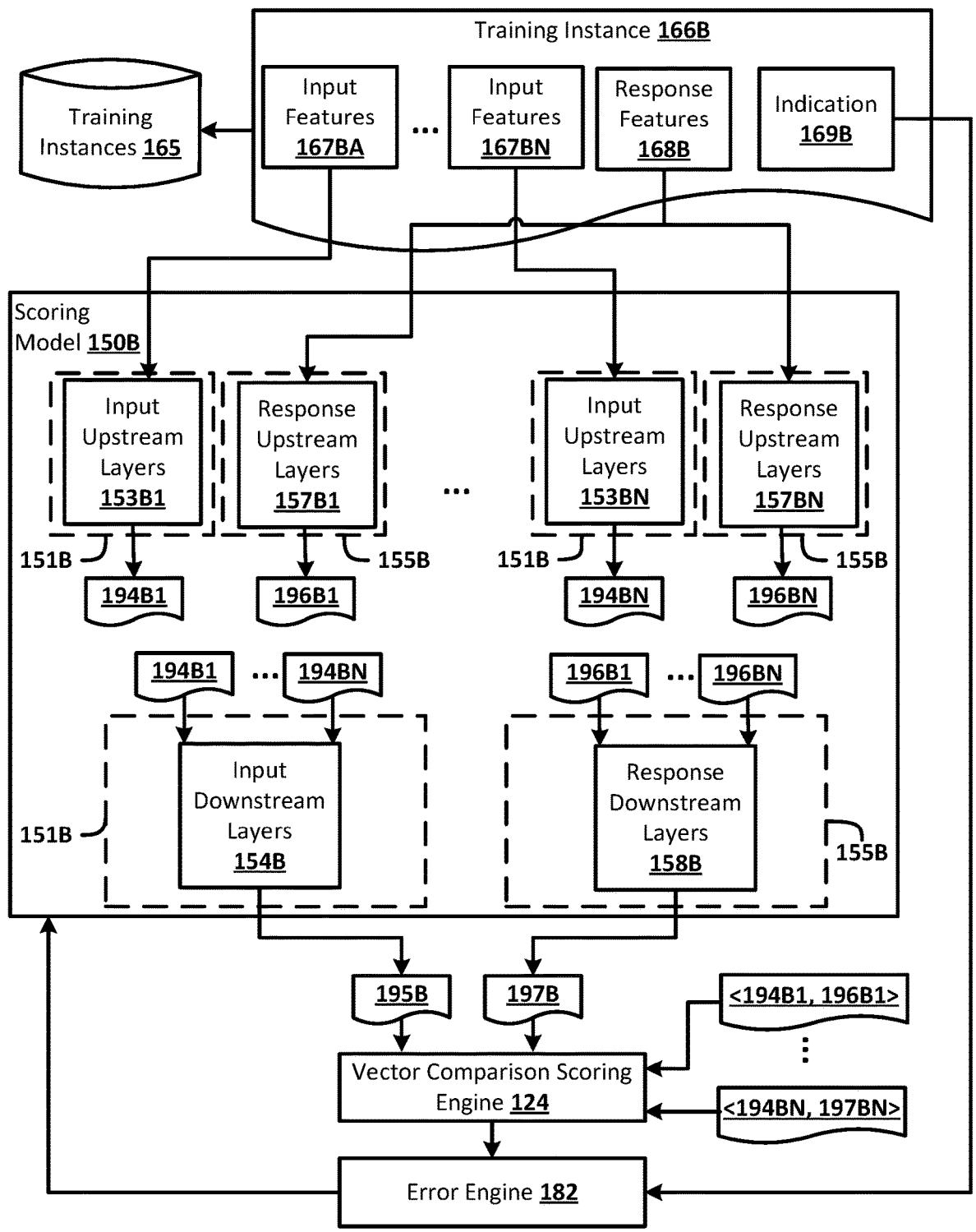
FIG. 2B illustrates an example of training another implementation of the scoring model.

FIG. 2B illustrates an example of training another implementation of a scoring model 150B. The scoring model 150B includes an implementation 151B of the input neural network model 151 of FIG. 1 and an implementation 155B of the response neural network model 155 of FIG. 1. The training of the scoring model 150A may be performed by a training engine (e.g., implemented by one or more CPUs, GPUs, and/or TPUs) and the training engine may include the error engine 182 of FIG. 2B.

In FIG. 2B, a training instance 166B is retrieved from training instances database 165. The training instance 166B includes multiple groups of input features. The multiple groups of input features are indicated as first group of input features 167BA through nth group of input features 167BN (with the ellipsis therebetween indicating additional group(s) of input features may be provided). Each group of the input features of the training instance 166B can be based on unique features and/or unique combinations of features of an electronic communication. For example, first group of input features 167BA can be body features and nth group of input features 167BN can be subject features. As another example, first group of input features 167BA can be body features from a most recent message of the communication and nth group of input features 167BN can be body features from prior message(s) of the communication.

The training instance 166B also includes response features 168B and an indication 169B. The response features 168B can be based on features of a true response to the electronic communication when the training instance 166B is a positive instance, or a response that is not a true response when the training instance 166B is a negative instance. The indication 169B indicates whether the training instance 166B is a negative or positive training instance.

The first input features 167BA of the training instance 166B are applied as input to the input upstream layers 153B1 of the input neural network model 151B of the scoring model 150B. The nth input features 167BN of the training instance 166B are applied as input to the input upstream layers 153BN of the input neural network model 151B of the scoring model 150B. The input upstream input layers 153B1 are parallel to the input upstream input layers 153BN.

A first input vector 194B1 is generated over the input upstream layers 153B1 based on the application of the input features 167BA. An nth input vector 194BN is generated over the input upstream layers 153BN based on the application of the input features 167BN.

Input is applied to input downstream layers 154B of the input neural network model 151B. That input is based on a combination of the first input vector 194B1, the nth input vector 194BN, and any other input vectors from any additional unillustrated input upstream layers (that would each be based on a corresponding different group of input features of the training instance 166B). The combination of the vectors can be a concatenation, an addition (e.g., a weighted sum), and/or other combination.

An overall input vector 195B is generated over the input downstream layers 154B based on the application of the input to those layers 154B.

The response features 168B of the training instance 166B are applied as input to the response upstream layers 157B1 of the response neural network model 155B of the scoring model 150B. The response features 168B of the training instance 166B are also separately applied as input to the response upstream layers 157BN of the response neural network model 155B of the scoring model 150B. The response upstream layers 157B1 are parallel to the response upstream layers 157BN.

A first response vector 196B1 is generated over the response upstream layers 157B1 based on the application of the response features 168B to those layers 157B1. An nth response vector 196BN is generated over the response upstream layers 157BN based on the application of the response features 168B to those layers 157BN.

Input is applied to response downstream layers 158B of the response neural network model 155B. That input is based on a combination of the first response vector 196B1, the nth response vector 196BN, and any other response vectors from any additional unillustrated response upstream layers (that would each also be based on a corresponding separate application of the response features 168B). The combination of the vectors can be a concatenation, an addition (e.g., a weighted sum), and/or other combination.

An overall response vector 197B is generated over the response downstream layers 158B based on the application of the input to those layers 158B.

The vector comparison scoring engine 124 determines a response score based on comparison of the overall input vector 195B and the overall response vector 197B. For example, the vector comparison scoring engine 124 can determine a response score that is the scalar result of a dot product between the two vectors. The vector comparison scoring engine 124 also determines an additional response score based on comparison of the first input vector 194B1 and the first response vector 196B1. The vector comparison scoring engine 124 further also determines another additional response score based on comparison of the nth input vector 194BN and the nth response vector 196BN. Where further input upstream layer, response upstream layer pairs are provided, the relevance comparison scoring engine 124 may further determine yet additional response scores based on corresponding input and response vector pairs.

The vector comparison scoring engine 124 provides the multiple response scores to the error engine 182. The error engine 182 determines the error (if any) for each of the multiple response scores based on comparison of the response score to the actual response score indicated by the indication 169B. For example, the error engine 182 may determine a first error based on comparison of a first response score to the actual response score, a second error based on comparison of a second response score to the actual response score, etc. The error engine 182 then updates both the input neural network model 151B and the response neural network model 155B based on the multiple errors (and optionally based on other error(s) determined for a batch of training instances, when batch learning is utilized and the training instance of FIG. 2B is part of the batch). For example, assume: a first error that is based on comparison of the dot product of vectors 195B and 197B to the actual response score indicated by the indication 169B; a second error that is based on comparison of the dot product of vectors 194B1 and 196B1 to the actual response score indicted by the indication 169B; and a third error that is based on comparison of the dot product of vectors 194BN and 196BN. The error engine 182 can update the input downstream layers 154B and response downstream layers 158B based on the first error (e.g., through backpropogation of a gradient that is based on the error and a loss function). The error engine 182 can update the input upstream layers 153B1 and response upstream layers 157B1 based on the second error, and based on any remaining gradient from the application of the first error to the layers 154B and 158B. The error engine 182 can also update the input upstream layers 153BN and response upstream layers 157BN based on the third error, and based on any remaining gradient from the application of the first error to the input layers 132B3 and subsequent content layers The scoring model 150B of FIG. 2B is a multi-loss model that determines each error of the multiple errors based on comparison (e.g., dot product) between output vectors generated over two parallel layers that are "paired", but separate. Such a multi-loss model enables the cooperative training of paired parallel layers. For example, the response upstream layers 157B1 and input upstream layers 153B1 are "paired" in the example of FIG. 2B since the error engine 182 determines an error that is based on a dot product of the separate vectors 194B1 and 196B1 generated over the layers 153B1 and 157B1—and updates the layers 153B1 and 157B1 based on that error. For instance, layers 153$b$1 and 157B1 can be updated based on that error, whereas other layers are not. Accordingly, while remaining separate, layers 157B1 and 153B1 are trained dependent on one another—thereby effectively independently training layers 157B1 and 153B1 to score responses. Likewise, the response upstream layers 157BN and the input upstream layers 153BN are trained dependent on one another, while still remaining separate. For example, the error engine 182 determines an error that is based on a dot product of the separate vectors 194BN and 196BN generated over the layers 153BN and 157BN—and updates the layers 153BN and 157BN based on that error. For instance, layers 153BN and 157BN can be updated based on that error, whereas the other layers are not. The input downstream layers 154B and the response downstream layers 158B are also trained dependent on one another, while still remaining separate. For example, the error engine 182 determines an error that is based on a dot product of the separate vectors 195B and 197B generated over the layers 154B and 158B—and updates the layers 154B and 158B based on that error. The error engine 182 may further apply any remaining gradient, after updating the layers 154B and 158B, to the upstream layers 153B1, 153BN, 157B1, 157BN.

Although FIG. 2B is illustrated with respect to a single training instance, it is understood that during training of the scoring model 130A a large quantity of training instances will be utilized.

Figure 3:
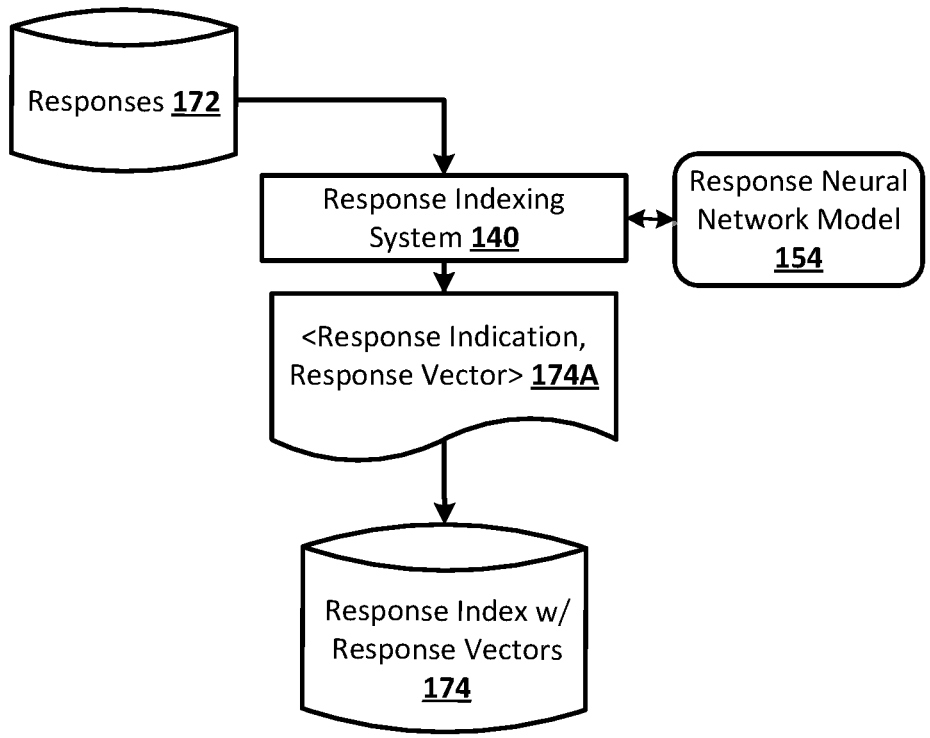
FIG. 3 illustrates an example of generating a response vector for a response, and storing the response vector in association with the response.

FIG. 3 illustrates an example of generating a response vector for a response, and storing the response vector in association with the response. The response indexing system 140 retrieves a response from responses database 172. Responses database 172 may be, for example, a database of "whitelist" responses (e.g., responses that meet certain criteria such as frequency of use criteria, length criteria, content criteria).

The response indexing system 140 generates a response vector based on applying response features of the response as input to the response neural network model 154. The response features may be, for example, word embedding features and/or other features, such as those described above with respect to the input features. In particular, the response indexing system 140 generates the response vector over the response neural network model 154 based on the applied input. The response vector, and an indication of the response 174A (e.g., the response itself or an associated identifier) is stored by the response indexing system 140 in the response index with response vectors 174. The response indexing system 140 also stores an association of the response vector to the indication of the response.

The response indexing system 140 generates the response index with response vectors 174 through processing of a large quantity (e.g., all) of the responses of responses database 172. The generated index 174 includes corresponding pre-determined response vectors and/or other values stored in association with each of the responses. For example, index 174 can have a stored association of "Response A" to a corresponding response vector, a stored association of "Response B" to a corresponding response vector, etc. The index 174 can have similar stored associations to each of a plurality of (thousands, hundreds of thousands, etc.) additional responses.

Various techniques may be utilized for storing and/or structuring the associations and/or the values in the index 174. For example, in some implementations, the index 174 is partitioned into multiple shards. In some of those and/or other implementations, the response indexing system 140 determines multiple clusters of response vectors, seeking to cluster similar vectors together. The response indexing system 140 can build a tree or other structure to enable initial searching (e.g., by vector comparison scoring engine 124) for relevant response vectors by cluster. Such a tree or other structure can enable searching each cluster first to identify the most relevant cluster(s) as opposed to the more computationally inefficient searching of each response vector individually.

In some implementations, the response indexing system 140 generates, for index 174, a hierarchical model that is based on a hierarchical combination of vector quantization, orthogonal transformation, and product quantization of transformed response vector quantization residuals. The hierarchical model can be approximated by a hierarchical quantization $HQ(\mathbf{h}_y)$ $$\mathbf{h}_y \approx HQ(\mathbf{h}_y) = VQ(\mathbf{h}_y) + PQ(R(r_y)),$$

where $r_y = \mathbf{h}_y - VQ(\mathbf{h}_y)$ $VQ(\mathbf{h}_y)$ is the vector quantization of response vector $\mathbf{h}_y$, i.e.

$$VQ(h_y) = \arg\min_{c \in \{c_{VQ_j}\}} \|h_y - c\|^2$$

and $R \in \mathbb{R}^{d \times d}$ is a learned orthogonal rotation, applied to the residuals of vector quantization. $PQ(r_y)$ is the product quantization of the rotated residual. The product quantizer $PQ(r_y)$ is given by $$PQ(r_y) = \begin{pmatrix} PQ^{(1)}(r_y^{(1)}) \\ PQ^{(2)}(r_y^{(2)}) \\ \vdots \\ PQ^{(K)}(r_y^{(K)}) \end{pmatrix}, r_y = \begin{pmatrix} r_y^{(1)} \\ r_y^{(2)} \\ \vdots \\ r_y^{(K)} \end{pmatrix}$$

The concatenation of codewords is obtained by dividing the rotated residuals $r_\psi$ into K subvectors $r_\psi^{(k)}$, k=1, 2, ..., K, and quantizing the subvectors independently by vector quantizers $C_{PQ}^{(k)}(\cdot)$:

$$PQ^{(k)}(r_y^{(k)}) = \underset{s \in \left\{ C_{PQ_j^{(k)}} \right\}}{\arg\min} \|s - r_y^{(k)}\|^2.$$

At training time, the codebook for vector quantization, $C_{VQ}$, codebooks for product quantization $C_{PQ}^{(\cdot)}$, and the rotation matrix R are all jointly trained to minimize the reconstruction error of $\mathbf{h}_\psi - HQ(\mathbf{h}_\psi)$ using stochastic gradient descent (SGD). At inference time, prediction is made by taking the candidates with the highest quantized dot product. The distance computation can be performed very efficiently without reconstructing $HQ(\mathbf{h}_\psi)$, but by utilizing a lookup table for asymmetric distance computation. Furthermore, the lookup operation can be carried out in register using SIMD (single instruction, multiple data) instructions.

Figure 4:
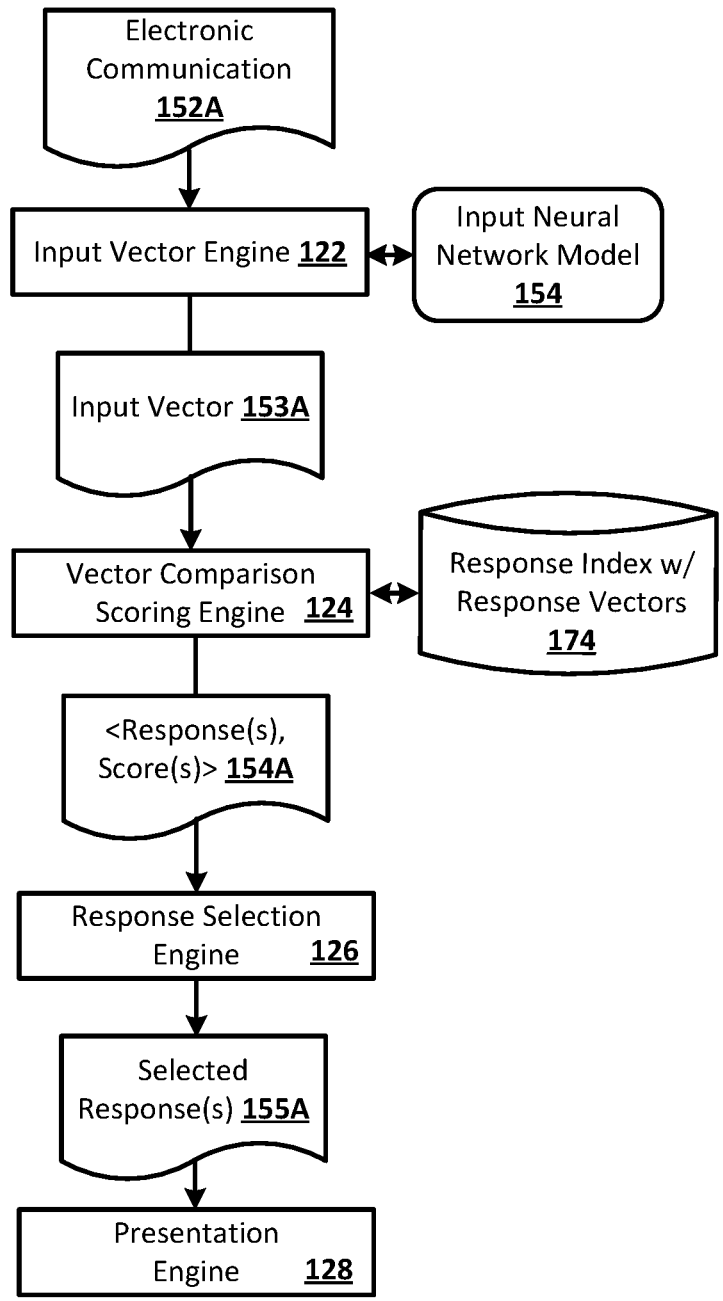
FIG. 4 illustrates an example of generating an input vector based on a received electronic communication, and selecting responses based on comparison of the input vector to response vectors stored in association with the selected responses.

FIG. 4 illustrates an example of generating an input vector based on a received electronic communication, and selecting responses based on comparison of the input vector to response vectors stored in association with the selected responses In FIG. 4, input vector engine 122 determines input features based on electronic communication 152A. The input vector engine 122 generates an input vector 153A based on applying those input features as input to the input neural network model 154, and generating the input vector 153A over the model 154 based on the applied input.

The vector comparison scoring engine 124 uses the input vector 153A to determine, from index 174, one or more responses and scores 154A to provide to response selection engine 126. For example, the vector comparison scoring engine 124 may determine the responses and/or scores based on a dot product of the input vector to corresponding pre-stored response vectors for those responses in index 174.

Response selection engine 126 determines selected response(s) 155A of the received responses and scores 154A, and provides those selected responses 155A to the presentation engine 128. The presentation engine 128 provides the selected responses 155A as suggestions for inclusion in a reply to the electronic communication 152A.

Figure 5:
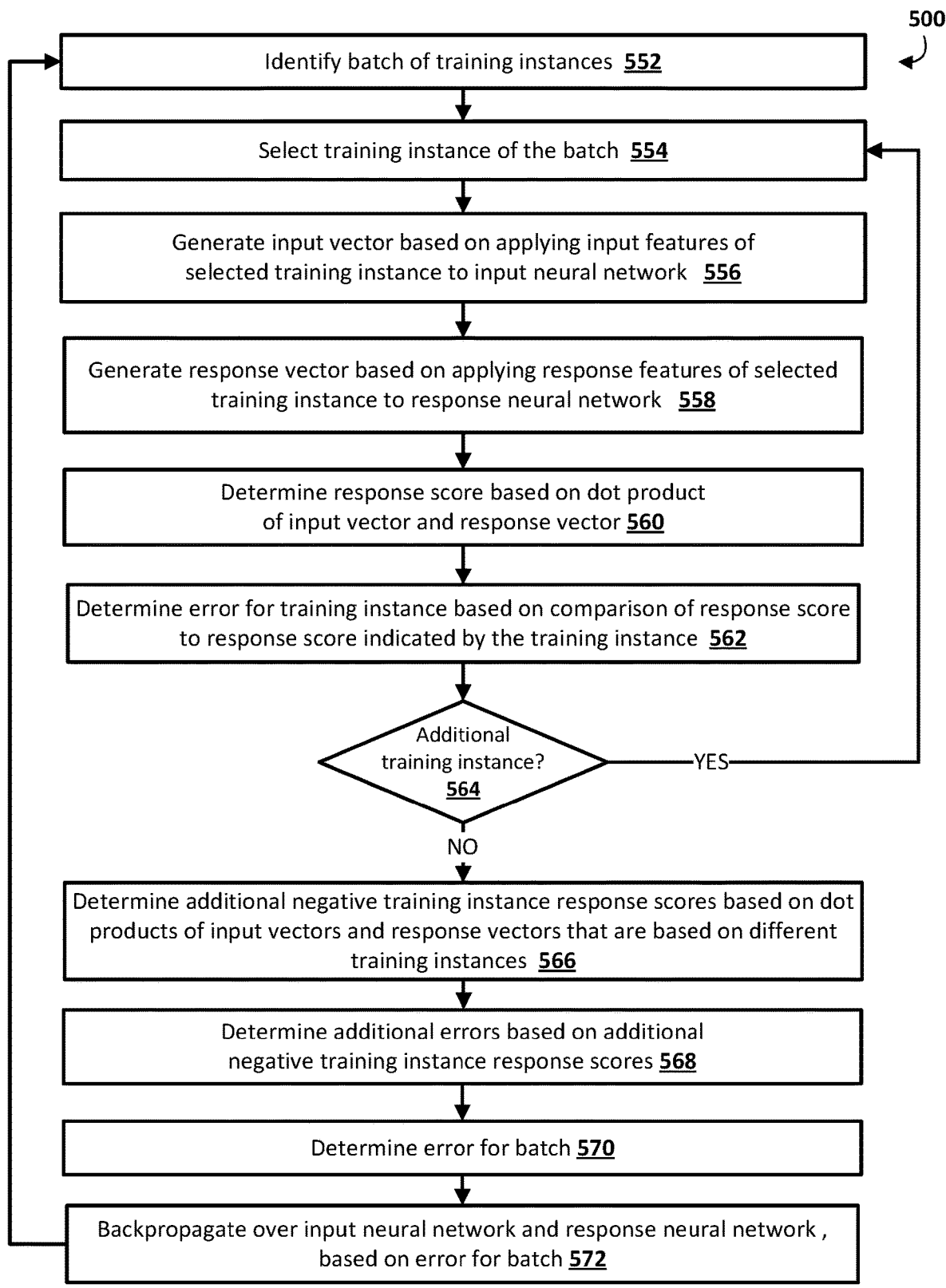
FIG. 5 is a flowchart illustrating a method of training a scoring model according to various implementations disclosed herein.

Turning now to FIG. 5, a flowchart is provided that illustrates a method 500 of training a scoring model according to various implementations disclosed herein. For convenience, the operations of the flow chart are described with reference to a system that performs the operations. This system may include one or more components, such as one or more processors (e.g., CPU(s), GPU(s), and/or TPU(s)). While operations of method 500 are shown in a particular order, this is not meant to be limiting. One or more operations may be reordered, omitted or added.

At block 552, the system identifies a batch of training instances. For example, each of the training instances may be a positive training instance with one or more groups of input features, response features, and an indication of whether the instance is a positive or negative instance.

At block 554, the system selects a training instance of the batch.

At block 556, the system generates an input vector based on applying one or more groups of input features of the selected training instance to an input neural network.

At block 558, the system generates a response vector based on applying response features of the selected training instance to a response neural network.

At block 560, the system determines a response score based on a dot product of the input vector generated in block 556 and the response vector generated in block 558.

At block 562, the system determines an error for the training instance based on comparison of the response score to a response score indicated by the training instance. For example, where the training instance is a positive training instance, the response score indicated by the training instance may be "1" or other "positive" value.

At block 564, the system determines whether there are any additional unprocessed training instances in the batch. If so, the system proceeds to block 554 and selects an additional training instance. The system then performs blocks 556, 558, 560, and 562 based on the additional training instance.

If, at an iteration of block 564, the system determines there are not any additional unprocessed training instances in the batch, the system proceeds to block 566.

At block 566, the system determines additional negative response scores based on dot products of input vectors and response vectors that are based on different training instances. For example, the system can determine an additional negative training instance response scores based on a dot product of an input vector generated at block 556 based on a first training instance and a response vector generated at block 558 based on a different second training instance. By using an input vector and a response vector generated based on two different training instances, it can be assumed that the corresponding input features and response features are not based on an "actual" electronic communication, response pair. Accordingly, it can be assumed that the additional response scores generated at block 566 are additional "negative" response scores. Performance of block 566 effectively provides additional negative training instances, while enabling the reuse of previously generated input vectors and response vectors. In other words, additional negative training instances are effectively obtained without requiring computationally intensive generation of further input vectors and response vectors.

As one particular example, assume the batch of block 552 consists of 100 positive training instances. After training based on the 100 positive training instances, 100 input vectors and 100 response vectors have been generated. A first "negative" relevance value can be generated based on the dot product of a first input vector for a first training instance and a second response vector of a second training instance. A second "negative" relevance value can be generated based on the dot product of the first input vector and a third response vector of a third training instance. Additional "negative" relevance values can be determined based on dot products of the first input vector and the response vectors for the fourth through one hundredth training instances. Further, 99 "negative" relevance values can be similarly determined based on the input vector for the second training instance, and the response vectors of the other training instances (those that are not the second training instance); 99 "negative" relevance values ban be similarly determined based on the input vector for the third training instance, and the response vectors of the other training instances (those that are not the third training instance); etc. Accordingly, 9,900 "negative" relevance values can be generated through relatively computationally efficient dot product calculations of vectors already generated based on the positive training instances. Further, an overall error can be determined (at block 670 below) that is based on a function of all of the "negative" relevance values (e.g., a softmax function) and the overall error backpropagated (at block 572) over the input neural network and the response neural network.

At block 568, the system determines additional errors based on the additional negative response scores determined at block 566. In particular, because the response scores determined at block 566 are considered to be for additional negative instances, the system determines the additional errors based on comparison of the negative response scores of block 566 to a "0" or other "negative" value.

At block 570, the system determines an error for the batch. The error for the batch can be based on the errors determined at iterations of block 562 and block 568.

At block 572, the system backpropogates over the input neural network model and the response neural network model based on the error for the batch.

The system may then identify a new batch of training instances, and restart method 500 for the new batch. Such training may continue until one or more criteria are satisfied. Although FIG. 5 illustrates a particular batch training approach, it is understood that non-batch training may additionally or alternatively be utilized in training. Also, in some implementations blocks 566 and 568 may be omitted and/or other blocks may be omitted or added.

In some implementations where additional negative instance response scores are utilized during training (e.g., as described with respect to blocks 566 and 568 of method 500), it may be the case that response vectors for common responses with high prior likelihood are utilized frequently. Such a bias may lead to scoring model that favors specific and long responses instead of short and generic ones. To rectify this, some implementations may bias a response score for a given response generated at run-time (e.g., by vector comparison scoring engine 124) using a bias score derived from the log likelihood of the given response (e.g., as estimated using a language model). In other words, the bias score may "boost" the response score for common responses (indicated as common by the language model) more than the response score for non-common responses. In some of those implementations, since language models inherently assign lower probabilities to longer sequences, another bias score may optionally be added to boost the score of long responses.

Figure 6A:
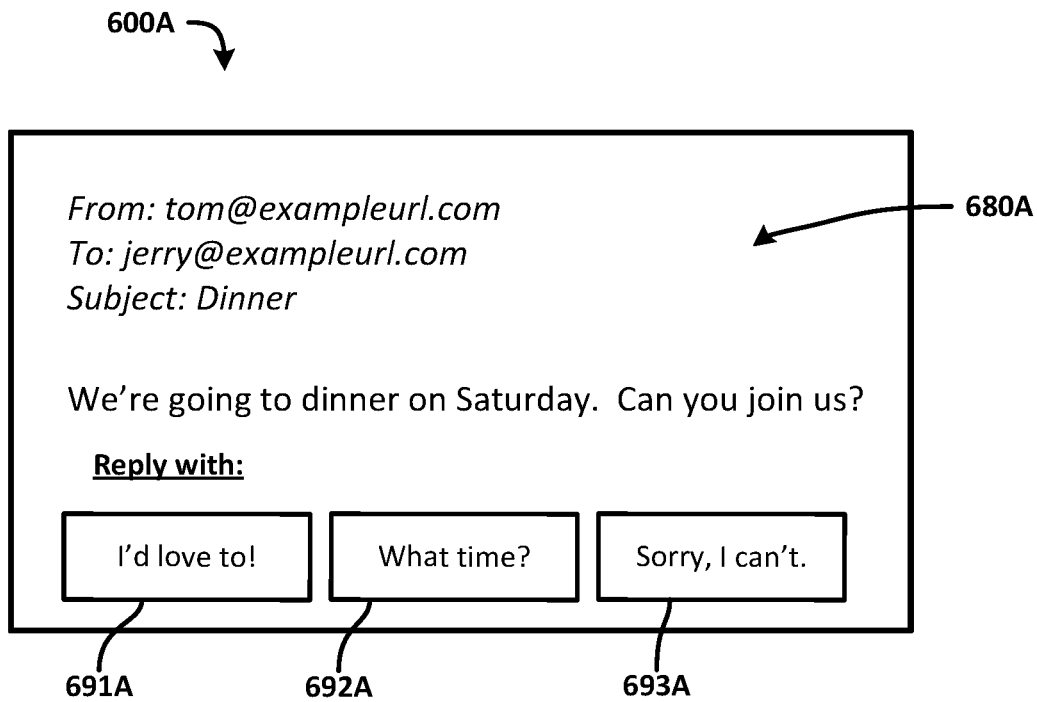
FIG. 6A and FIG. 6B each illustrate example graphical user interfaces and for providing selected responses as suggestions for inclusion in a reply to a received electronic communication.
Figure 6B:
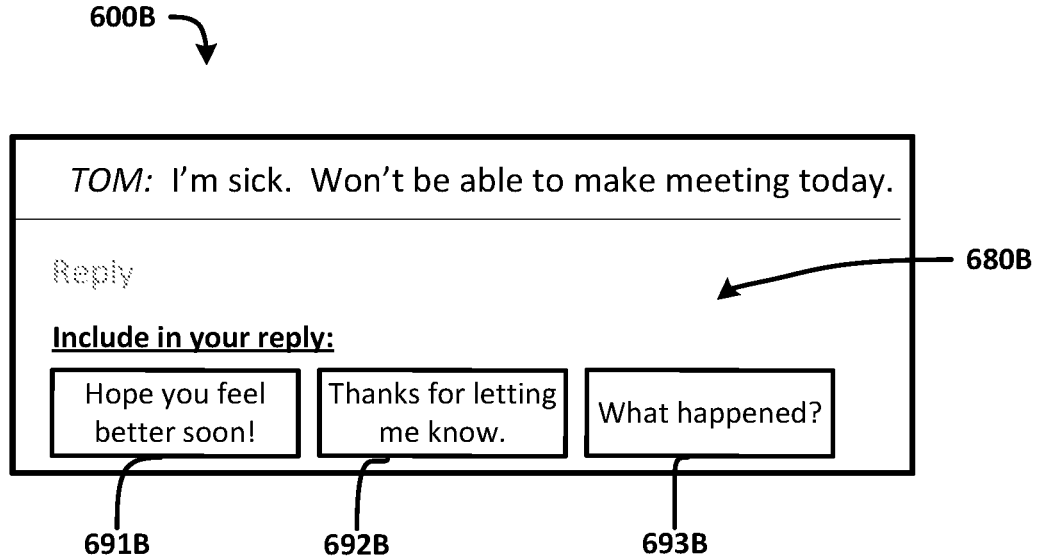

FIG. 6A and FIG. 6B each illustrate example graphical user interfaces 600A and 600B for providing selected responses as suggestions for inclusion in a reply to a received electronic communication. The graphical user interfaces 600A and 600B may be presented at client device 106 (e.g., in a browser executing at client device 106 and/or in a dedicated electronic communication application executing at client device 106).

In FIG. 6A, an original email 680A that has been sent to a user is being viewed by the user, before the user has provided any user interface input to indicate a desire to reply to the original email 680A. Selected responses 691A, 692A, and 693A are presented in the graphical user interface 600A and are presented for inclusion in a reply to the email. For example, a user selection of response 691A may automatically present an editable reply email to the user that includes the text "I'd love to!" automatically incorporated in the reply email—or may automatically generate and send such a reply email (without first presenting an editable version to the user). The user selection of a response may be a single user interface input such as a single "tap", a single "mouse click", etc.

In FIG. 6B, an original chat message 680B that has been sent to a user is being viewed by the user, before the user has provided any content for inclusion in a reply to the original chat message 680B (e.g., possibly after the user has selected a "reply" interface element, but before the user has "typed" anything for the reply). Selected responses 691B, 692B, and 693B are presented in the graphical user interface 600B and are presented for inclusion in a reply to the original chat message 680B. For example, a user selection of response 693B may automatically present an editable reply chat message to the user that includes the text "What happened?" automatically incorporated in the reply—or may automatically generate and send such a reply chat message (without first presenting an editable version to the user).

Although examples of graphical interfaces are presented in FIGS. 6A and 6B, it is understood that selected responses may additionally or alternatively be provided for presentation to a user audibly via a client device. For example, the client device 106 may audibly "read" a received electronic communication, then audibly provide "Speak A to respond with I'd love to, B to respond with what time, C to respond with sorry, I can't". In response to spoken user interface input of A, B, or C during or after the audible providing, the client device 106 may then cause a corresponding reply to be generated and sent.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 7:
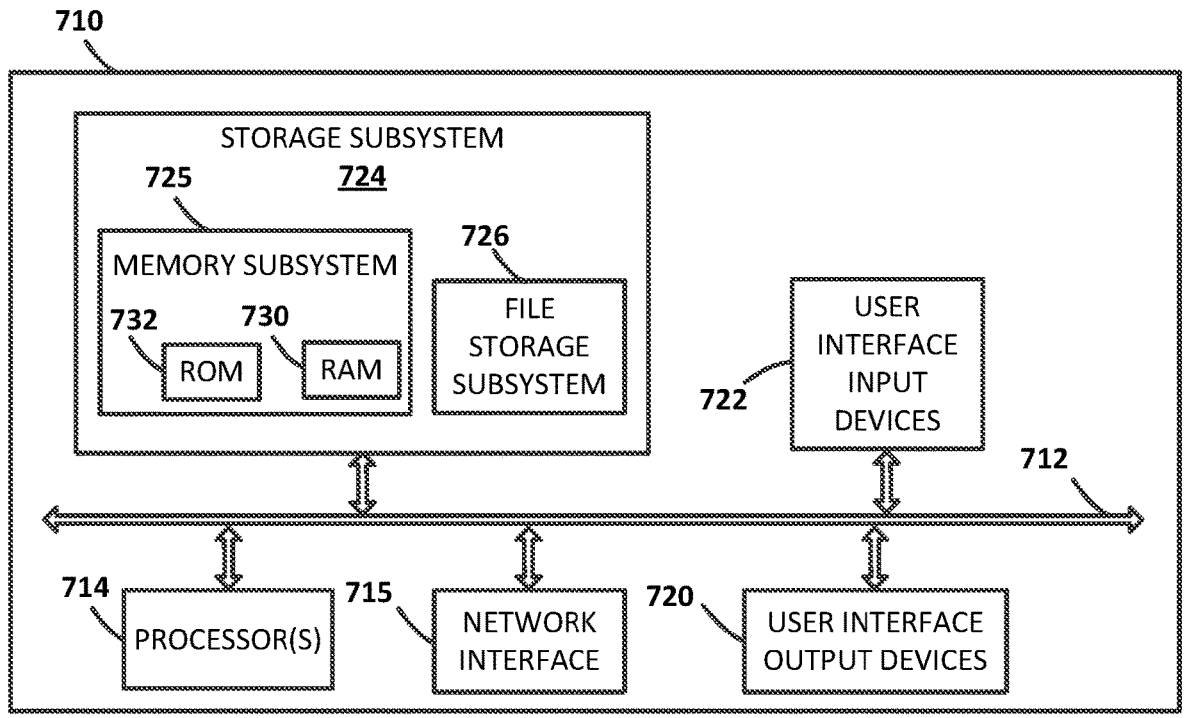
FIG. 7 illustrates an example architecture of a computing device.

FIG. 7 is a block diagram of an example computing device 710 that may optionally be utilized to perform one or more aspects of techniques described herein. Computing device 710 includes at least one processor 714 (e.g., a CPU, GPU, and/or TPU) which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 715. The input and output devices allow user interaction with computing device 710. Network interface subsystem 715 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a regular image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods described herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a solid state drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:

identifying a plurality of positive training instances that each include input features and response features, wherein for each of the positive training instances:

the input features are based on content of an electronic communication, wherein the input features comprise groups of input features including at least a first group of input features and a second group of input features, each of the groups of input features being based on unique features or unique combinations of features of the electronic communication, and the response features are based on a reply electronic communication that is a reply to the electronic communication;

training a scoring model based on the positive training instances, wherein training the scoring model based on a given instance of the positive training instances comprises:

generating a first input vector based on applying the first group of input features to a first parallel input upstream layer of an input neural network model of the scoring model, wherein generating the first input vector is independent of the response features;

generating a first response vector based on applying the response features to a first parallel response upstream layer of a response neural network model of the scoring model, wherein generating the first response vector is independent of the input features;

determining a first response score based on comparison of the first input vector and the first response vector;

updating the first parallel input upstream layer and the first parallel response upstream layer based on comparison, by an error engine, of the first response score to a given response score indicated by the given instance, the given response score indicated by the given instance being a positive response score;

generating a second input vector based on applying the second group of input features to a second parallel input upstream layer of the input neural network model of the scoring model, wherein generating the second input vector is independent of the response features;

generating a second response vector based on applying the response features to a second parallel response upstream layer of the response neural network model of the scoring model, wherein generating the second response vector is independent of the input features;

determining a second response score based on comparison of the second input vector and the second response vector; and updating, by the error engine, the second parallel input upstream layer and the second parallel response upstream layer based on comparison of the second response score to the given response score indicated by the given instance;

generating an overall input vector based on application of the first and second input vectors to input downstream layers of the input neural network model of the scoring model, generating the overall input vector being independent of the first and second response vectors;

generating an overall response vector based on application of the first and second response vectors to response downstream layers of the input neural network model of the scoring model, generating the overall response vector being independent of the first and second input vectors;

determining an overall response score based on comparison of the overall input vector and the overall response vector; and updating the input downstream layers and the response downstream layers based on comparison of the overall response score to the given response score indicated by the given instance.

2. The method of claim 1, further comprising:
subsequent to training the scoring model:
identifying an additional response;
generating an additional response vector based on applying additional response features of the additional response to the response neural network model of the scoring model; and
storing, in one or more computer readable media, an association of the additional response vector to the additional response.

3. The method of claim 2, further comprising:
subsequent to storing the association of the additional response vector to the additional response:
receiving new input features of a new electronic communication, the new electronic communication directed to a user and generated subsequent to the storing;
generating a new input vector based on applying the new input features to the input neural network model of the scoring model;
generating a response score that indicates a likelihood that the additional response is an appropriate response for the new electronic communication, wherein generating the response score is based on comparison of the new input vector to the additional response vector stored in association with the additional response; and
based on the response score, providing to a client device of the user a suggestion to include the additional response in a reply to the new electronic communication, wherein the additional response is provided to the client device based on the new electronic communication being directed to the user.

4. The method of claim 3, wherein the comparison of the new input vector to the response vector is a dot product of the new input vector and the response vector.

5. A method implemented by one or more processors, comprising:
identifying input features of a transmitted electronic communication directed to a user;
applying the input features to parallel input upstream layers of a trained input neural network model;
generating, based on applying the input features, a corresponding input vector over each of the parallel input upstream layers, wherein generating the corresponding input vectors is independent of any response features of any responses;
generating an overall input vector over the trained input neural network model based on applying the corresponding input vectors to downstream input layers of the trained input neural network model, wherein generating the overall input vector is independent of any response features of any responses, wherein the trained input neural network model is trained based on backpropagation that is based on errors during training by:
for each of the parallel input upstream layers, generating a training input vector based on applying training input features of a group of training input features associated with the input upstream layer to the associated input upstream layer;
for each of a plurality of parallel response upstream layers of a response neural network model, generating a response vector based on applying response features to the associated response upstream layer;
for each of multiple pairs each comprising a corresponding one of the input vectors and a corresponding one of the response vectors, determining a response score based on comparison of the corresponding one of the input vectors and the corresponding one of the response vectors; and
for each of the multiple pairs, updating both the input upstream layer and the response upstream layer used to generate the pair, the updating based on comparison, by an error engine, of the response score for the pair to a given response score indicated by the given instance the given response score indicated by the given instance being a positive response score; and
determining a response to provide for inclusion in a reply electronic communication that is a reply by the user to the electronic communication, wherein determining the response is based on comparison of the overall input vector to a pre-stored value, the pre-stored value being stored in association with the response prior to transmission of the electronic communication, the pre-stored value being generated based on applying response features of the response to the response neural network model.

6. The method of claim 5, further comprising:
providing the response for display in an interface rendered by a client device of the user, the interface enabling selection of the response for inclusion in the reply electronic communication.

7. The method of claim 5, wherein the pre-stored value is a response vector generated based on applying the response features to the response neural network model.

8. The method of claim 7, wherein the comparison of the input vector to the pre-stored value is a dot product of the input vector and the response vector.

9. The method of claim 5, wherein applying the input features to the parallel input upstream layers of the trained input neural network model comprises:
applying a first group of the input features to first input layers of the trained input neural network model; and
applying a second group of the input features to second input layers of the trained input neural network model.

10. The method of claim 9, wherein generating the overall input vector over the trained input neural network model based on applying the corresponding input vectors to the downstream input layers of the trained input neural network model comprises:
generating a first input vector, of the corresponding input vectors, based on applying the first group of the input features to the first input layers;
generating a second input vector, of the corresponding input vectors, based on applying the second group of the input features to the second input layers;

applying, to the downstream input layers of the input neural network model, a combined input vector that is based on the first input vector and the second input vector; and generating the overall input vector over the downstream input layers based on the combined input vector.

11. The method of claim 9, further comprising:
prior to transmission of the electronic communication:
generating the pre-stored value based on applying response features of the response to the response neural network model; and
storing, in one or more computer readable media, the pre-stored value in association with the response.

12. A system, comprising:
memory storing a trained input neural network model;
one or more processors executing stored instructions to cause one or more of the processors to:
identify input features of a transmitted electronic communication directed to a user;
apply the input features to parallel input upstream layers of the trained input neural network model;
generate, based on applying the input features, a corresponding input vector over each of the parallel input upstream layers, wherein generating the corresponding input vectors is independent of any response features of any responses;
generate an overall input vector over the trained input neural network model based on applying the corresponding input vectors to downstream input layers of the trained input neural network model, wherein generating the overall input vector is independent of any response features of any responses,
wherein the trained input neural network model is trained based on backpropagation that is based on errors during training by:
for each of the parallel input upstream layers, generating a training input vector based on applying training input features of a group of training input features associated with the input upstream layer to the associated input upstream layer;
for each of a plurality of parallel response upstream layers of a response neural network model, generating a response vector based on applying response features to the associated response upstream layer;
for each of multiple pairs each comprising a corresponding one of the input vectors and a corresponding one of the response vectors, determining a response score based on comparison of the corresponding one of the input vectors and the corresponding one of the response vectors; and
for each of the multiple pairs, updating both the input upstream layer and the response upstream layer used to generate the pair, the updating based on comparison, by an error engine, of the response score for the pair to a given response score indicated by the given instance the given response score indicated by the given instance being a positive response score; and
determine a response to provide for inclusion in a reply electronic communication that is a reply by the user to the electronic communication, wherein determining the response is based on comparison of the overall input vector to a pre-stored value, the pre-stored value being stored in association with the response prior to transmission of the electronic communication, the pre-stored value being generated based on applying response features of the response to the response neural network model.

13. The system of claim 12, wherein one or more of the processors, in executing the instructions, are further to:
provide the response for display in an interface rendered by a client device of the user, the interface enabling selection of the response for inclusion in the reply electronic communication.

14. The system of claim 12, wherein the pre-stored value is a response vector generated based on applying the response features to the response neural network model.

15. The system of claim 14, wherein the comparison of the input vector to the pre-stored value is a dot product of the input vector and the response vector.

16. The system of claim 12, wherein in applying the input features to the parallel input upstream layers of the trained input neural network model, one or more of the processors are to:
apply a first group of the input features to first input layers of the trained input neural network model; and
apply a second group of the input features to second input layers of the trained input neural network model.

17. The system of claim 16, wherein in generating the overall input vector over the trained input neural network model based on applying the corresponding input vectors to the downstream input layers of the trained input neural network model, one or more of the processors are to:
generate a first input vector, of the corresponding input vectors, based on applying the first group of the input features to the first input layers;
generate a second input vector, of the corresponding input vectors, based on applying the second group of the input features to the second input layers;
apply, to the downstream input layers of the input neural network model, a combined input vector that is based on the first input vector and the second input vector; and
generate the overall input vector over the downstream input layers based on the combined input vector.

18. The system of claim 17, wherein one or more of the processors, in executing the instructions, are further to:
prior to transmission of the electronic communication:
generate the pre-stored value based on applying response features of the response to the response neural network model; and
store, in one or more computer readable media, the pre-stored value in association with the response.

* * * * *